United States Patent
Mori (10) Patent No.: US 8,644,830 B2
(45) Date of Patent: Feb. 4, 2014

(54) CONNECTION CONTROL METHOD FOR MOBILE COMMUNICATION, MOBILE COMMUNICATION MANAGEMENT APPARATUS AND MOBILE STATION APPARATUS

(75) Inventor: Shinichi Mori, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 473 days.

(21) Appl. No.: 12/597,816

(22) PCT Filed: Apr. 25, 2008

(86) PCT No.: PCT/JP2008/058115
§ 371 (c)(1),
(2), (4) Date: Jan. 13, 2010

(87) PCT Pub. No.: WO2008/139901
PCT Pub. Date: Nov. 20, 2008

(65) Prior Publication Data
US 2010/0151864 A1    Jun. 17, 2010

(30) Foreign Application Priority Data

Apr. 27, 2007   (JP) ................. 2007-120260

(51) Int. Cl.
*H04W 36/00* (2009.01)
(52) U.S. Cl.
USPC ...... 455/436; 455/519; 455/456.1; 455/456.2
(58) Field of Classification Search
USPC ............... 455/436, 519, 456.1, 456.2
See application file for complete search history.

(56) References Cited

U.S. PATENT DOCUMENTS

| | | | |
|---|---|---|---|
| 2005/0130644 A1* | 6/2005 | Bassompierre et al. | ... 455/422.1 |
| 2007/0004405 A1* | 1/2007 | Buckley et al. | ............... 455/434 |
| 2007/0254620 A1* | 11/2007 | Lindqvist et al. | ............. 455/403 |

(Continued)

FOREIGN PATENT DOCUMENTS

| | | |
|---|---|---|
| JP | 4-90223 A | 3/1992 |
| JP | 2001-506100 A | 5/2001 |

(Continued)

OTHER PUBLICATIONS

Patent Abstracts of Japan, Publication No. 4-90223, dated Mar. 24, 1992, 1 page.

(Continued)

*Primary Examiner* — Barry Taylor
(74) *Attorney, Agent, or Firm* — Osha Liang LLP (57) ABSTRACT

In a mobile communication system including a certain user targeted base station (Home eNB), fast cell search and handover are achieved without unnecessary signaling and without increasing interference with other cells. In the mobile communication system, when it is detected that a mobile station permitted to access the certain user targeted base station has entered or exists within a location registration area associated with the certain user targeted base station, connection information including at least frequency information being presently used by the certain user targeted base station and ID information for the certain user targeted base station is transmitted to the mobile station in a dedicated manner. The mobile station performs cell search based on the transmitted connection information. In a preferred embodiment, the mobile station receives adjacent cell frequency information broadcast from a resident public targeted base station and performs the cell search based on the frequency information in the transmitted connection information as well as the adjacent cell frequency information.

12 Claims, 5 Drawing Sheets

(56) References Cited

U.S. PATENT DOCUMENTS

| | | | |
|---|---|---|---|
| 2008/0096563 A1* | 4/2008 | Fischer et al. | 455/436 |
| 2008/0102896 A1* | 5/2008 | Wang et al. | 455/560 |
| 2008/0200146 A1* | 8/2008 | Wang et al. | 455/410 |
| 2008/0220782 A1* | 9/2008 | Wang et al. | 455/436 |
| 2008/0254812 A1* | 10/2008 | Kitazoe | 455/456.2 |
| 2012/0083273 A1* | 4/2012 | Mukherjee et al. | 455/436 |

FOREIGN PATENT DOCUMENTS

| | | |
|---|---|---|
| JP | 2006-519513 A | 8/2006 |
| WO | 98/43457 A1 | 10/1998 |
| WO | 2005/048626 A1 | 5/2005 |
| WO | 2007/040449 A1 | 4/2007 |
| WO | 2007/040454 A2 | 4/2007 |

OTHER PUBLICATIONS

3GPP TSG RAN #35, RP-070209, "Requirements for LTE Home eNodeBs", Lemesos, Cyprus, Mar. 6-9, 2007, 4 pages.
International Search Report issued in PCT/JP2008/058115, mailed on Sep. 2, 2008, with translation, 9 pages.
Written Opinion issued in PCT/JP2008/058115, mailed on Sep. 2, 2008, 5 pages.
Office Action for Japanese Patent Application No. 2007-120260 mailed Jun. 5, 2012, with English translation thereof (4 pages).

* cited by examiner

CONNECTION CONTROL METHOD FOR MOBILE COMMUNICATION, MOBILE COMMUNICATION MANAGEMENT APPARATUS AND MOBILE STATION APPARATUS

TECHNICAL FIELD

The present invention generally relates to the field of mobile communication and more particularly relates to an efficient mobile station connection control method in a mobile communication network including a small and low-cost private base station (Home e-NodeB) dedicated for certain users as well as a mobile communication management apparatus and a mobile station for implementing that method.

BACKGROUND ART

Presently, it is being discussed and proposed to introduce a very small base station targeted for certain users for implementing FMC (Fixed and Mobile Convergence) services (see "Requirements for LTE Home eNodeBs", RP-070209, 3GPP TSG RAN #35, Lemesos, Cyprus, 6-9 Mar. 2007). In LTE (Long Term Evolution), whose specification development is being currently ongoing, as a successor to the third generation radio access scheme, such very small base stations targeted for certain or specified users are collectively referred to as Home eNBs (or Home e-NodeBs). The Home eNB is a so-called plug-and-play type of apparatus that a user can buy and install at a desired location without the necessity of operator's manual installation, maintenance and management.

The Home eNB may have overlapped geographical areas with public targeted base stations (which are conveniently referred to as "macro eNBs") that are constituents of an existing public communication network. Also, its serving frequency is enabled in combination with frequencies served by adjacent macro eNBs. As a result, when a mobile station migrates from an area covered by an adjacent macro eNB (referred to as a "macro cell") into a serving area of the Home eNB, efficient cell search and/or handover may be required.

In a conventional mobile communication network, a base station uses common control channels such as BCHs to broadcast center frequencies used by adjacent base stations for fast inter-frequency cell search and fast inter-frequency handover at a mobile station. Before placing a new base station into service, an operator investigates the center frequencies used by adjacent base stations serving other coverage areas bordering a coverage area served by that new base station and then generates an adjacent cell list, which is installed in the new base station. A mobile station could receive a common channel such as a BCH broadcast from a base station providing a resident cell and determine the center frequencies used in other cells adjacent to that cell. Among many possible center frequencies, the mobile station could identify the center frequencies presently used in the adjacent cells, which results in faster cell search and handover at cell transition. As a result, the mobile station can select optimal cells while maintaining communication quality of dedicated links.

DISCLOSURE OF INVENTION

Problem to be Solved by the Invention

However, conventional mobile communication control methods cannot be directly applied to a system to which a certain user targeted base station for certain or specified users such as a Home eNB is introduced. For example, when a user leaves home, the user may power off a radio unit of the Home eNB. Then, when the user comes home, the user may power on the radio unit again. Thus, the Home eNB may be suspended and restarted iteratively depending on a user's behavior, and thus there is a likelihood that whenever the Home eNB is restarted, different center frequencies may be used. Assuming that the Home eNB is listed in the adjacent cell lists for adjacent public communication eNBs (macro eNBs), whenever the Home eNB is restarted, some operations and signaling for updating the center frequency for the Home eNB in the adjacent cell lists may have to be performed. It is predicted that a large number of Home eNBs may be installed, and thus the above-mentioned adverse effect could not be ignored for the whole network.

On the other hand, the center frequency used by the certain user targeted Home eNB has to be known to only mobile stations permitted to access the Home eNB. Even if it is broadcast from a macro eNB to many unspecified mobile stations, unnecessary measurement and signaling may be increased in mobile stations that are not permitted to access the Home eNB. As a result, interference to other cells or battery energy consumption in the mobile stations may be unnecessarily increased.

For the above-mentioned reasons, it would not be practical to list information regarding the Home eNB in the adjacent cell list for the macro eNB and update it constantly.

One object of the present invention is to provide a connection control method that enables efficient cell search and fast handover in a mobile communication system including a Home eNB while preventing increase in power consumption in a mobile station.

Another object of the present invention is to provide a mobile communication management apparatus for implementing the above connection control method and a mobile station apparatus for use in the system.

Means for Solving the Problem

In order to achieve the above objects, when a mobile station belonging to a mobile station group having a certain attribute, such as a mobile station permitted to access a base station for certain users (Home eNB), enters or now exists within a location registration area (tracking area) associated with that Home eNB, for example, a network side management apparatus detects the mobile station and transmits a center frequency and/or other connection parameters (including scrambling code, a cell ID and/or others) used by the Home eNB to the mobile station in a dedicated manner. The transmitted connection parameters are stored in the mobile station until a message for discarding the connection parameters is received from a network.

Specifically, according to a first aspect of the present invention, a connection control method is provided. In this method, connection information with a certain user targeted base station is transmitted to a mobile station belonging to a mobile station group associated with the certain user targeted base station in a dedicated channel corresponding to the mobile station or a multicast channel corresponding to the mobile station group via a public targeted base station where the mobile station resides.

According to a second aspect of the present invention, a connection control method includes detecting that a mobile station permitted to access a certain user targeted base station has entered or occurred within a location registration area associated with the certain user targeted base station; transmitting connection information including at least frequency information presently used by the certain user targeted base station and ID information for the certain user targeted base station to the mobile station in a dedicated manner; and performing cell search at the mobile station based on the connection information.

According to a third aspect of the present invention, a mobile station for use in a mobile communication system including a certain user targeted base station is provided. The mobile station includes a dedicated information acquisition unit configured to, if the mobile station belongs to a mobile station group associated with the certain user targeted base station, acquire connection information for the certain user targeted base station in a dedicated manner; a broadcast information acquisition unit configured to acquire broadcast adjacent cell information on an adjacent cell in a public targeted base station where the mobile station resides; and a cell search determination unit configured to perform cell search based on the acquired connection information for the certain user targeted base station and the broadcast adjacent cell information.

According to a fourth embodiment of the present invention, a mobile communication management apparatus for use in a mobile communication system including a certain user targeted base station is provided. The mobile communication management apparatus includes a memory unit configured to store identification information for the certain user targeted base station in association with mobile station information for a mobile station having a predefined attribute associated with the certain user targeted base station and frequency information presently used by the certain user targeted base station; a location monitoring unit configured to monitor location of the mobile station; an indication information generation unit configured to, when the location monitoring unit detects that a mobile station having the predefined attribute has entered or occurred within a location registration area associated with the certain user targeted base station, generate connection information with reference to the memory unit, the connection information including at least the identification information and the frequency information for the certain user targeted base station; and a transmitting unit configured to transmit the connection information to the mobile station.

Advantage of the Invention

According to the aspects of the present invention, efficient cell search and fast handover are achieved in a mobile communication system including a Home eNB while preventing increase in power consumption in a mobile station.

LIST OF REFERENCE SYMBOLS

10: mobile station
11T: transmit antenna
11R: receive antenna
12: base station targeted transmitting unit
13: base station targeted receiving unit
14: user interface unit
15: common control channel information acquisition unit (common information acquisition unit)
16: dedicated control channel information acquisition unit (dedicated information acquisition unit)
17: memory unit
17t: connection parameter table
18: cell search determination unit
20: Home eNB (certain user targeted base station)
21: home cell
30: macro eNB (public targeted base station)
31: macro cell
35: tracking area (location registration area)
40: upper node
40A: MME (mobile communication management apparatus)
41: network interface
42: base station targeted receiving unit
43: mobile station location monitoring unit
44: indication information generation unit
45: Home eNB-UE association database
46: Home eNB frequency database
47: base station targeted transmitting unit

BEST MODE FOR CARRYING OUT THE INVENTION

Figure 1:
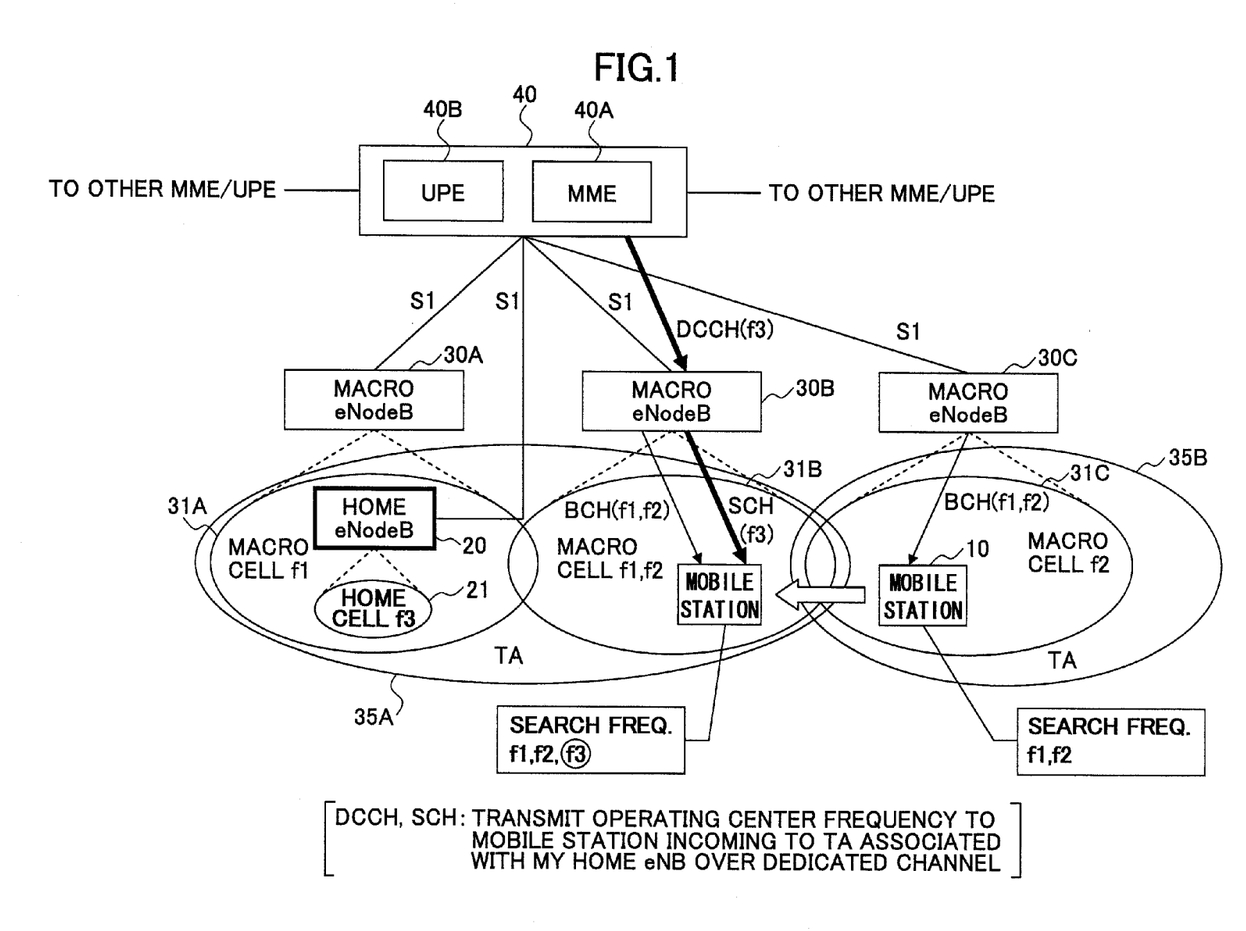
FIG. 1 schematically illustrates an exemplary mobile communication system to which the present invention is applied.

Preferred embodiments of the present invention are described below with reference to the accompanying drawings. FIG. 1 schematically illustrates an exemplary arrangement and fundamental operations of a mobile communication system according to embodiments of the present invention. In the mobile communication system illustrated in FIG. 1, multiple radio base stations 30A, 30B, 30C, . . . constituting a public communication network form macro cells 31A, 31B, 31C, . . . , respectively, in such a manner that the macro cells 31A, 31B, 31C, . . . have overlapped boundaries. The radio base stations 30 forming the macro cells 31 are referred to as macro eNBs. In the macro eNB 30A, a carrier wave having a center frequency f1 (simply referred to as "frequency f1" hereinafter) is used. In the macro eNB 30B, frequencies f1 and f2 are used, and in the macro eNB 30C, the frequency f2 is used.

The macro eNBs 30A through 30C are logically connected with an upper management node 40 over a logical interface S1. For example, the upper management node 40 may include a MME (Mobile Management Entity) 40A and a UPE (User Plane Entity) 40B. The UPE 40B may be also referred to as a S-GW (Serving Gateway).

A Home eNB 20 working as a base station serving for certain users is provided within the macro cell 31A and presently uses a frequency f3. The Home eNB 20 is also logically connected with the upper management node (MME/UPE) 40 over the logical interface S1.

A mobile station 10 presently having a predetermined attribute associated with the Home eNB 20, such as a mobile station 10 permitted to access the Home eNB 20, is traveling from the macro cell 31C toward a home cell formed by the Home eNB 20. The macro eNB 30C for the macro cell 31C broadcasts frequency information (f1, f2) presently used in the adjacent macro eNB 30B in a BCH. As a result, the mobile station 10 can search for the f1 and f2 being used as the frequencies for the destination cell 31B.

The mobile station 10 enters not only the macro cell 30B but also a tracking area (TA) 35A that is a location registration area associated with the Home eNB 20. Upon detecting that the mobile station 10 has entered the tracking area 35A or has been found within the tracking area 35A based on location information for the mobile station 10 (for example, the mobile station 10 has been powered on within the tracking area), the MME 40A in the upper management apparatus 40 informs the mobile station 10 of the frequency f3 being used by the Home eNB 20 as well as other connection parameters (such as a scrambling code, a cell ID, a tracking area ID or a frequency bandwidth) in a dedicated manner. In the illustration in FIG. 1, the connection parameters (including the frequency f3) for the Home eNB 20 are transmitted from the MME 40A to the mobile station 10 via a DCCH (Dedicated Control Channel) and a SCH (Shared Channel) that is a physical dedicated control channel. These connection parameters are used for cell search and thus may be referred to as "cell search parameters" for convenience. In the illustration, the connection parameters are transmitted from the macro eNB 30B to the mobile station 10 via the physical dedicated control channel SCH but may be transmitted via a SCH ongoing from the Home eNB 20. Alternatively, a user may transmit a request for the connection parameters to the MME 40A through the user's manual operation of the mobile station 10, and upon reception of this request, the MME 40A may transmit the connection parameters to the mobile station 10 in a dedicated manner.

On the other hand, the macro eNB 30B broadcasts frequency information (f1, f2) regarding adjacent cells over BCHs, and thereby the mobile station 10 can search for the frequencies f1, f2 and f3. When the mobile station 10 actually approaches the home cell, the mobile station 10 can select any of the frequencies f1, f2 and f3. For example, the mobile station 10 may select the frequency f3 if the mobile station 10 is enabled to access the Home eNB 20 within the home cell 21 with fixed charge.

The mobile station 10 may have authority to access not only the illustrated Home eNB 20 but also another Home eNB. In this case, the mobile station 10 may be enabled to keep the connection parameters (cell search parameters) for both the Home eNBs. Alternatively, when the mobile station 10 exits from the tracking area 35A, the mobile station 10 may be instructed by the MME 40A via a dedicated channel to delete the connection parameters for the Home eNB 20.

In this manner, according to this embodiment, the connection parameters are transmitted via the dedicated channel to only the mobile station 10 permitted to access the Home eNB 20, which can prevent unnecessary signaling and interference with other cells. Also, the mobile station 10 does not receive cell parameter information for other Home eNBs that the mobile station 10 is not permitted to access. Thus, the mobile station 10 does not have to perform unnecessary cell search and can reduce power consumption.

Figure 2:
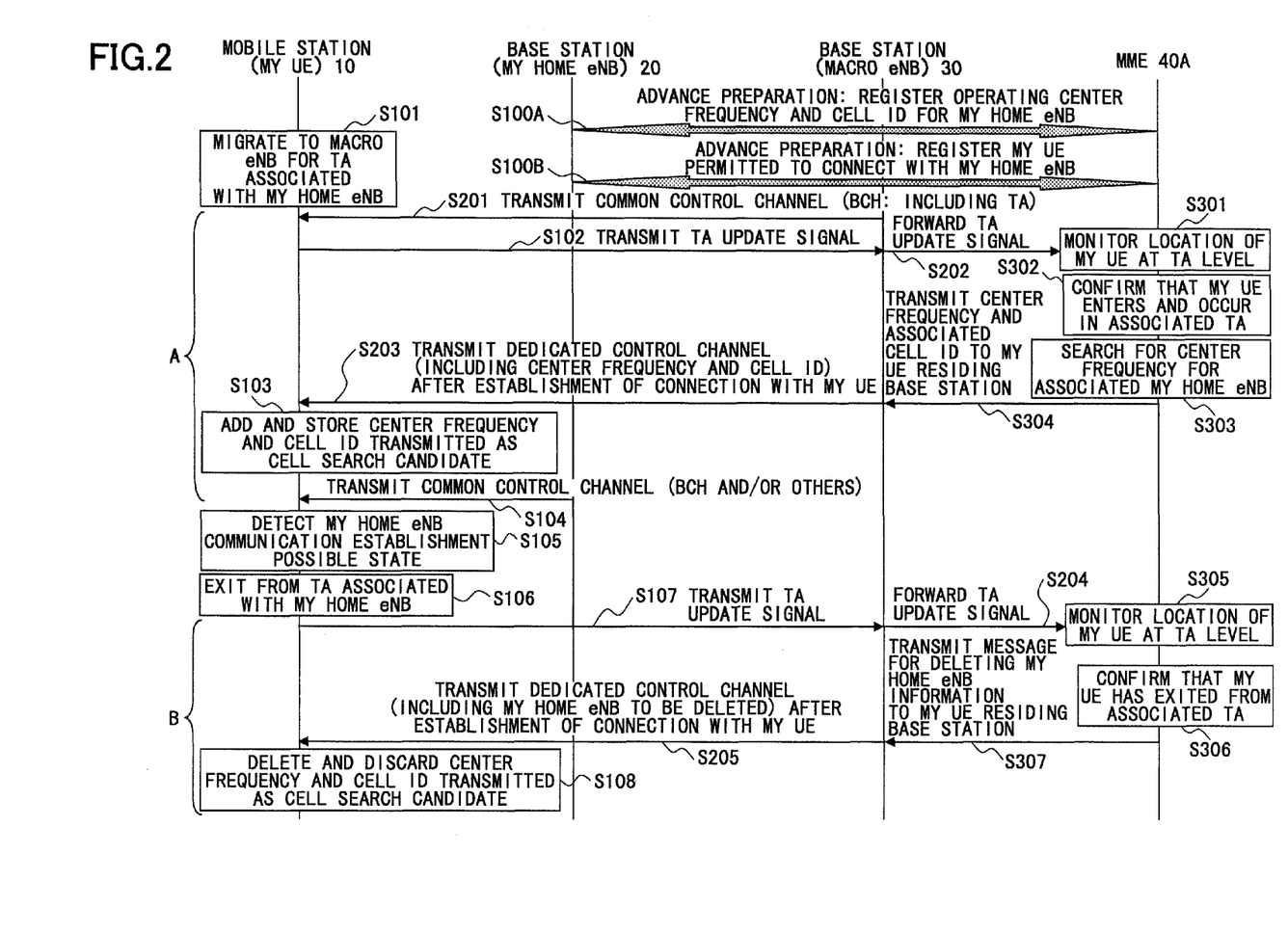
FIG. 2 is a sequence diagram illustrating exemplary connection control in the mobile communication system in FIG. 1.

FIG. 2 is a sequence diagram illustrating an exemplary connection control method in the mobile communication system in FIG. 1. At step S100A, a center frequency presently assigned to the Home eNB 20, a cell ID (and/or a scrambling code ID), ID information of the tracking area associated with that Home eNB and/or others are registered with MME 40A and the Home eNB 20 for advance preparation to transmit the connection parameters (cell search parameters) to the mobile station 10 entering or existing within the tracking area associated with the Home eNB 20. Since there is a higher likelihood that a different frequency from the previous frequency may be assigned as the center frequency after restart of the Home eNB 20, for example, at step S100B, the center frequency may be accordingly updated in the MME 40A in association with the cell ID. In addition, one or more mobile stations (UEs) permitted to access the Home eNB 20 are registered with the MME 40A in advance.

At step S101, the mobile station 10 migrates into an area for an adjacent macro eNB 30B deployed within the tracking area 35A associated with the access permitted Home eNB 20. At step S201, the macro eNB 30B broadcasts presently used frequency information and/or ID information for the tracking area over a common control channel such as a BCH. At step S102, the mobile station 10 receives the BCH from the macro eNB 30B, recognizes that the mobile station 10 itself has moved to a different tracking area 35A based on a comparison between the previous tracking ID information and the received ID information, and transmits a TA Update signal to the macro eNB 30B. At step S202, the macro eNB 30B forwards the TA Update signal to the upper apparatus MME 40A.

At step S301, the MME 40A monitors the location of the mobile station (UE) 10 at the level of the tracking areas. Upon reception of the TA Update signal, at step S302, the MME 40A detects that the mobile station 10 has entered or now exists in a new tracking area 35A, for example, that the mobile station 10 has been powered on within the tracking area 35A. At step S303, the MME 40A searches for the center frequency of a Home eNB 20 associated with this tracking area 35A. For the mobile station 10, only one Home eNB 20 may not be associated with the tracking area 35A. In other words, the mobile station 10 may be permitted to access two or more Home eNBs within the same tracking area 35A. Also in this case, necessary information is automatically transmitted from each Home eNB to the MME 40A at the advance preparation steps S100A and S100B, and thus the MME 40A can store the information.

At step S304, as a result of the search, the MME 40A transmits the cell ID of the Home eNB and the center frequency f3 presently used by the Home eNB over a dedicated channel to the macro eNB 30B where the mobile station (UE) 10 currently resides. At step S203, the macro eNB 30B establishes a connection with the mobile station 10 and then transmits the connection parameters including the cell ID and the center frequency in a dedicated control channel.

At step S103, the mobile station 10 adds and stores the transmitted cell parameters such as the center frequency and the cell ID as targets for the current cell search in a memory. Meanwhile, at step S104, the Home eNB 20 periodically transmits common control channels such as BCHs within the home cell 21. At step S105, the mobile station 10 detects the Home eNB 20 during the cell search and establishes communications with the Home eNB 20 at the frequency f3.

The above-mentioned steps correspond to cell parameter (Home eNB information) transmitting sequence A.

Upon exiting from the tracking area 35A associated with the Home eNB 20 at step S106, the mobile station 10 receives a common control channel from another macro eNB provided in a new tracking area where the mobile station migrates and detects that the mobile station 10 has moved to the different tracking area. At step S107, the mobile station 10 transmits a TA Update signal to a macro eNB for that tracking area. At step S204, the new macro eNB forwards the received TA Update signal to the MME 40A. Since the MME 40A monitors the location of the mobile station 10 at level of the tracking areas at step S305, the MME 40A can confirm that the mobile station 10 has exited from the previous tracking area 35A associated with the Home eNB 20 at step S306. At step S307, the MME 40A instructs the new macro eNB to transmit a deletion instruction of information on the Home eNB 20 received at the mobile station 10. At step S205, the new macro eNB establishes a connection with the mobile station 10 and then transmits the deletion instruction to delete the Home eNB 20 in a dedicated control channel. Upon reception of the dedicated control channel, the mobile station 10 deletes and discards the connection parameters such as the center frequency and the cell ID regarding the Home eNB 20. The above-mentioned steps correspond to a Home eNB information deletion sequence.

The mobile station 10 can add and store the connection parameters (cell search parameters) for several Home eNBs in the sequence A. However, when the mobile station 10 leaves a certain Home eNB and is away a predetermined distance, it may be less necessary to keep the connection parameters for that Home eNB or it may be likely to receive the connection parameters for another new Home eNB from the upper node 40 through a macro eNB. Thus, it is desirable to apply the deletion sequence B together with the sequence A.

Note that the deletion sequence B can be applied to not only the case where the mobile station 10 has exited from the tracking area 35A for the Home eNB 20 of interest but also the case where the mobile station 10 has disappeared, for example, the case where the mobile station 10 has been powered off in the tracking area 35A. In this case, when the MME 40A detects and confirms that the mobile station 10 has disappeared from the tracking area 35A (S305, S306) and then detects that the mobile station 10 appears in a tracking area not associated with the Home eNB 20 (S301, S302), the MME 40A informs the mobile station 10 via a new resident macro eNB 30 that the mobile station 10 should delete the connection parameters currently stored for the Home eNB (S307, S205).

Figure 3:
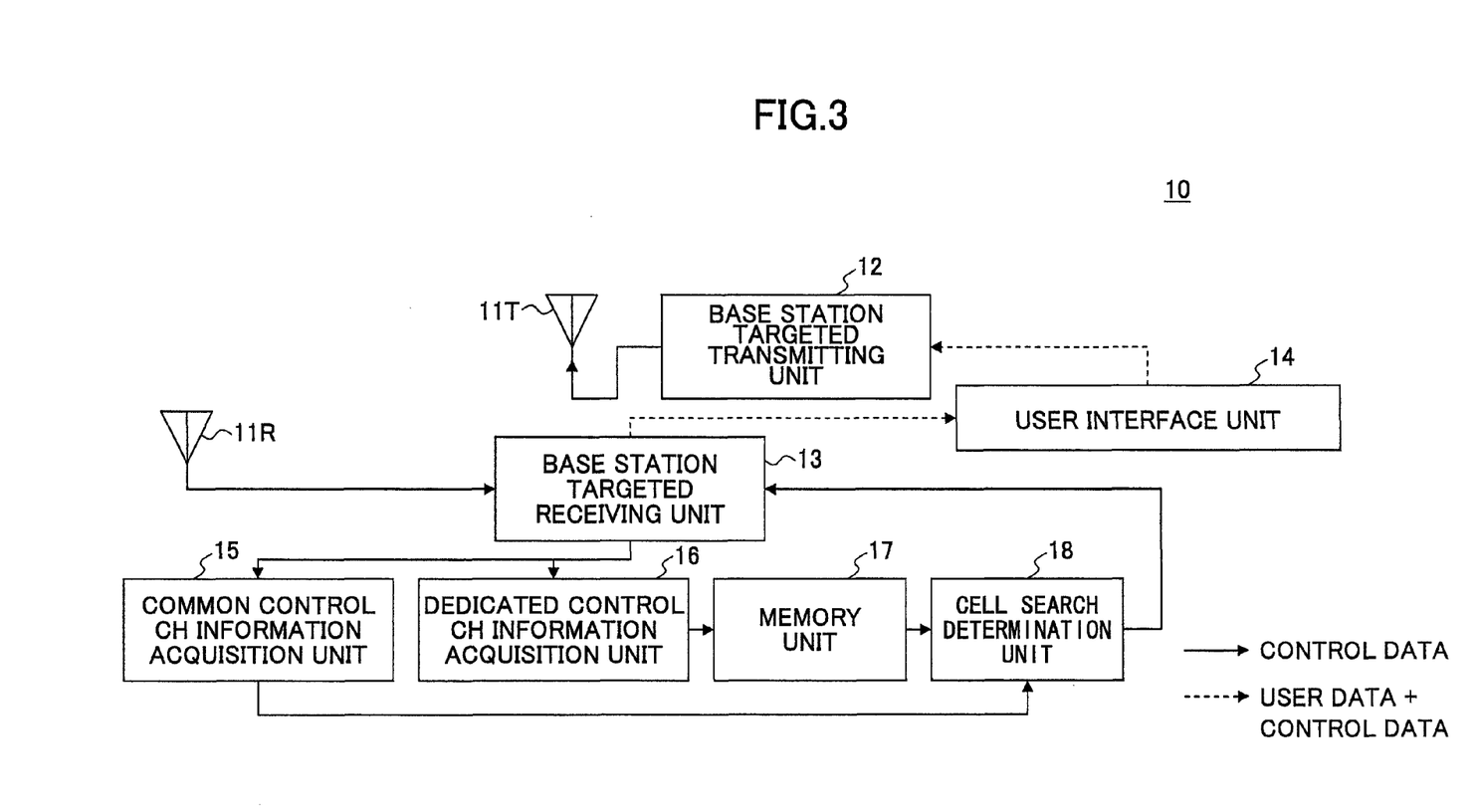
FIG. 3 is a block diagram illustrating an exemplary arrangement of a mobile station for use in the mobile communication system in FIG. 1.

FIG. 3 schematically illustrates an exemplary arrangement of the mobile station 10 for use in the mobile communication system in FIG. 1. The mobile station 10 includes a transmit antenna 11T, a receive antenna 11R, a base station targeted transmitting unit 12, a base station targeted receiving unit 13 and a user interface unit 14. The user interface unit 14 includes a microphone, a display, a numeric keypad and/or others. A signal processing unit including modulation and demodulation, encoding and decoding, frequency conversion and/or others is not directly relevant to the present embodiment and thus is not illustrated.

The mobile station 10 further includes a common control channel information acquisition unit 15, a dedicated control channel information acquisition unit 16, a memory unit 17 and a cell search determination unit 18. The common control channel information acquisition unit 15 is connected with the base station targeted receiving unit 13 and acquires common control channel information broadcast in common control channels from a macro eNB or a Home eNB where the mobile station 10 resides. Note that the acquired information includes center frequency information used by adjacent base stations (macro eNBs) listed in an adjacent cell list configured to the currently resident macro eNB of the mobile station 10. Of course, the acquired information may include a cell ID, a tracking area ID and/or others in addition to the center frequency information in the adjacent cell list. The common control channel information is supplied to the cell search determination unit 18 to use cell search.

The dedicated control channel information acquisition unit 16 is connected with the base station targeted receive unit 13 and acquires information transmitted from the MME 40A in dedicated control channels via the currently resident macro eNB. For example, the acquired information may be connection parameters (cell search parameters) for an access authorized Home eNB associated with a tracking area where the mobile station 10 has newly entered or exists now. The connection parameters are required for the mobile station 10 to perform handover to the access authorized Home eNB and thus are stored in the memory unit 17.

For the connection parameters for the access authorized Home eNB transmitted from the network side in dedicated control channels, for example, the memory unit 17 may store the presently used center frequency in association with the cell ID and keep them until a deletion instruction is transmitted in the same dedicated control channel. As mentioned above, there may be several Home eNBs that the mobile station 10 is permitted to access, and the memory unit 17 can store several pairs of the cell IDs and the center frequencies. Also, if a deletion instruction for certain connection parameters is received from the dedicated control channel information acquisition unit 16, the memory unit 17 deletes that connection parameters (a pair of center frequency and cell ID).

The cell search determination unit 18 performs cell search on only the center frequencies used by adjacent eNBs listed in the adjacent cell list broadcast from the macro eNB in common control channels such as BCHs and the center frequency (connection parameter) for the Home eNB stored in the memory unit 17. The mobile station 10 does not receive the connection parameters from the upper node for the Home eNBs that the mobile station 10 is not permitted to access, and thus even if the transmitted center frequencies for the Home eNBs are detected but are associated with cell IDs for Home eNBs unrelated to the transmitted cell IDs, the mobile station 10 does not attempt to connect to the Home eNBs.

If a pair of a center frequency and a cell ID for a certain Home eNB is deleted from the memory unit 17, the cell search determination unit 18 does not perform the cell search for that Home eNB. Also, if there is no Home eNB whose pair includes a certain center frequency, the cell search determination unit 18 stops the cell search for that center frequency.

Figure 4:
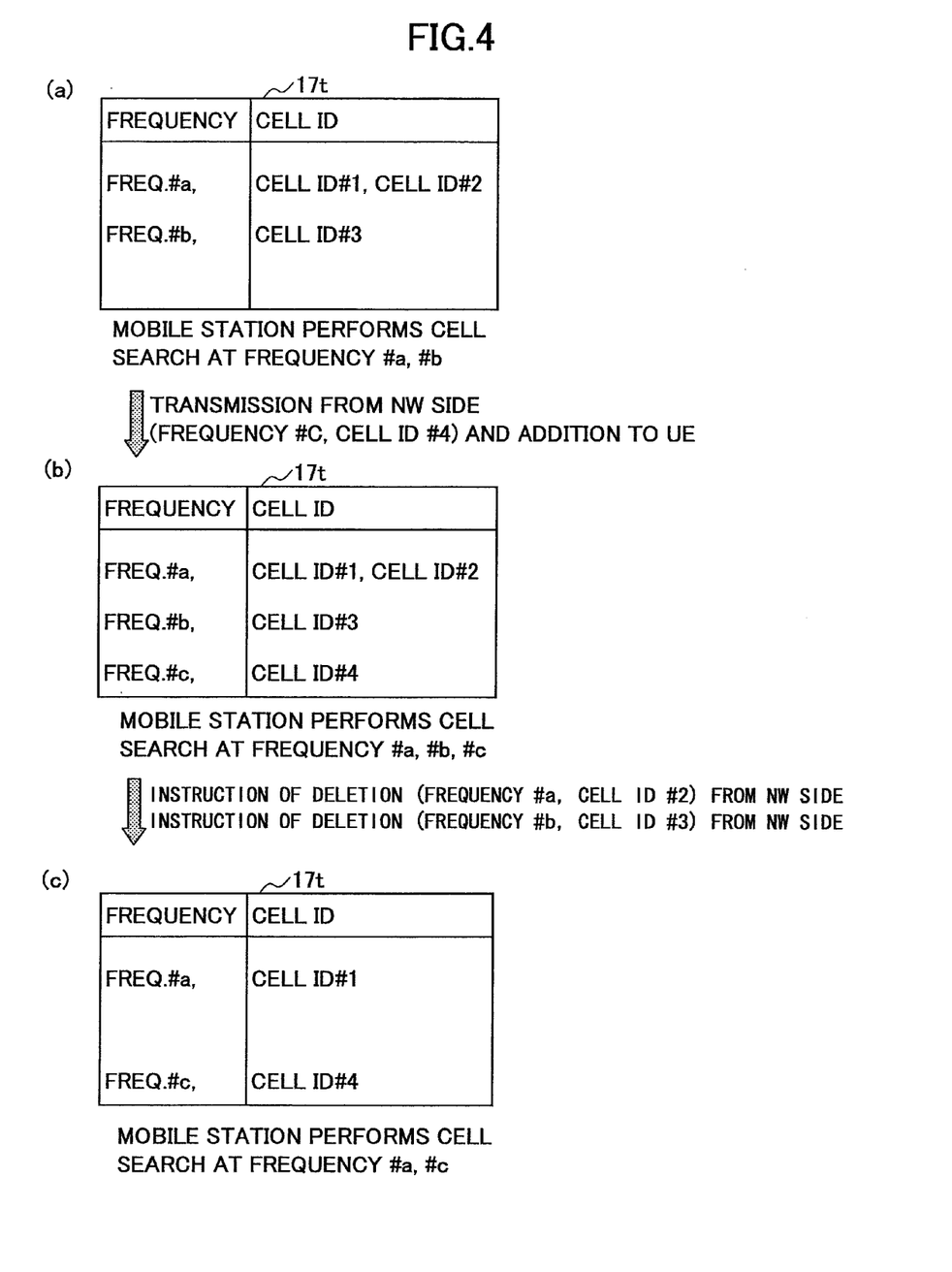
FIG. 4 illustrates an exemplary connection parameter table stored in a memory unit in the mobile station in FIG. 3.

FIG. 4 illustrates an exemplary connection parameter table 17t stored in the memory unit 17 of the mobile station 10. In the connection parameter table 17t, cell IDs for Home eNBs presently using certain center frequencies are listed in association with these center frequencies. In FIG. 4(a), the center frequency #a is associated with Home eNBs for cell IDs #1 and #2. Also, the center frequency #b is associated with a Home eNB for cell ID #3.

In this situation, when the connection parameters including the center frequency #c and the cell ID #4 are transmitted from the network side in a dedicated control channel, as illustrated in FIG. 4(b), the connection parameters are supplied from the dedicated control channel information acquisition unit 16 to the memory unit 17 and added to the connection parameter table 17t. This means that the mobile station 10 has entered a tracking area associated with a Home eNB for cell ID #4 or has been powered on within the tracking area. The mobile station 10 performs cell search based on center frequencies #a, #b and #c listed in the connection parameter table 17t and the center frequencies related to an adjacent cell list broadcast from a macro eNB where the mobile station 10 presently resides.

In addition, upon reception of an instruction to discard a Home eNB for cell ID #2 using center frequency #a and a Home eNB for cell ID #3 using center frequency #b from the network side, as illustrated in FIG. 4(c), the mobile station 10 deletes pairs corresponding to them from the connection parameter table 17t. As a result, the mobile station 10 performs cell search based on center frequencies #a and #c remaining in the connection parameter table 17t and center frequencies for adjacent eNBs broadcast from the resident macro eNB. If all cell IDs for a certain center frequency are deleted from the connection parameter table 17*t*, the cell search is stopped for that frequency. On the other hand, if a cell ID associated with the center frequency remains in the connection parameter table 17*t*, the cell search is performed for that frequency.

Figure 5:
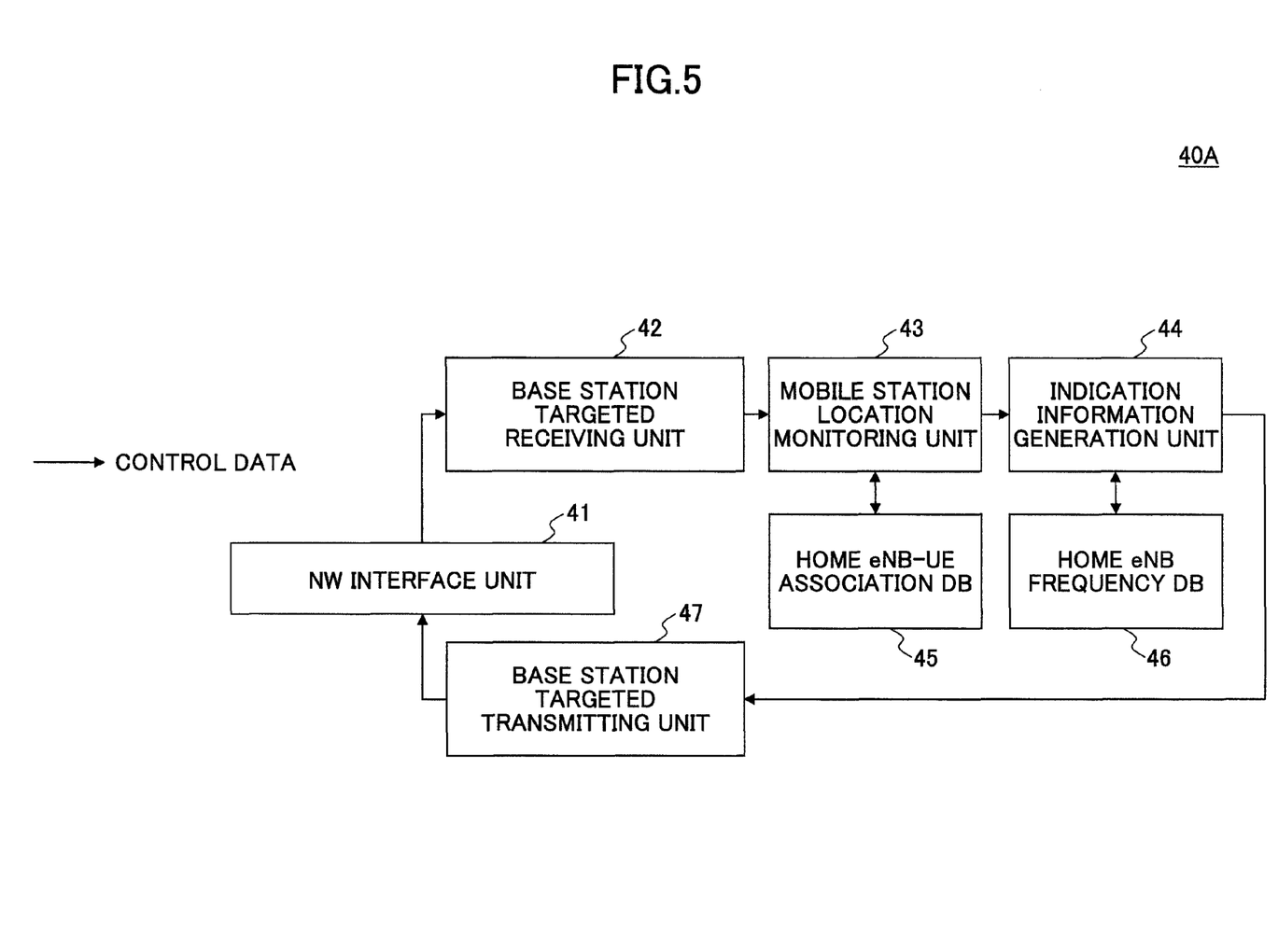
FIG. 5 is a block diagram illustrating an exemplary arrangement of a mobile communication management apparatus or MME for use in the mobile communication system in FIG. 1.

FIG. 5 illustrates an exemplary arrangement of an upper mobile communication management apparatus for use in the mobile communication system in FIG. 1. In this illustration, the mobile communication management apparatus is the MME 40A. The MME 40A includes a network interface 41, a base station targeted receiving unit 42, a mobile station location monitoring unit 43, an indication information generation unit 44, a Home eNB-UE association database 45, a Home eNB frequency database 46 and a base station targeted transmitting unit 47.

For each Home eNB, the Home eNB-UE association database 45 stores the corresponding tracking area and mobile stations permitted to access the Home eNB in an associated manner. For each Home eNB, the Home eNB frequency database 46 stores a center frequency presently assigned to the Home eNB in an associated manner.

For each Home eNB, the mobile station location monitoring unit 43 monitors the locations of all mobile stations (UEs) permitted to access (connect with) the Home eNB at the level of tracking areas.

The indication information generation unit 44 generates connection indication information to be transmitted to the mobile station 10 that has entered a tracking area associated with a certain Home eNB or is now within the tracking area. This connection indication information is connection parameter information including a center frequency presently used by the Home eNB and a cell ID for the Home eNB. In addition, the indication information generation unit 44 generates deletion information to be transmitted to the mobile station 10 that has exited a tracking area associated with a certain Home eNB or has disappeared from the tracking area. The deletion information includes a pair of a center frequency and a cell ID for a Home eNB to be deleted from the connection parameter table 17*t* in the mobile station 10. The connection indication information and the deletion information are transmitted to the mobile station 10 in a dedicated control channel via a macro eNB in whose cell the mobile station 10 resides.

As mentioned above, according to the above embodiments of the present invention, for each mobile station permitted to access a certain Home eNB in a mobile communication network configured by introducing a large number of Home eNBs in an existing public communication network, when it is detected that the mobile station has entered a tracking area associated with the Home eNB or now exists within the tracking area, the connection parameters for that Home eNB are transmitted to the mobile station in a dedicated manner. Thus, systems can reduce unnecessary signaling and/or interference with other cells while mobile stations can reduce power consumption due to unnecessary measurement for access unauthorized Home eNBs or transmission of location update messages.

In the above-mentioned embodiments, authority to access the Home eNB 20 has been described as a predefined attribute associated with the Home eNB 20, but the present invention is not limited to it. For example, existence within the tracking area 35 may be used as the attribute. Also in this case, the connection parameters are transmitted from the MME 40A in a dedicated manner as trigger of membership of the mobile station 10 in a mobile station group having such an attribute.

In the above-mentioned embodiments, center frequencies and cell IDs operated by Home eNBs are transmitted and stored in mobile stations in an associated manner. Instead of or in addition to the cell IDs, scrambling code IDs may be used. Any other ID information for identifying the Home eNBs may be used. Instead of or in addition to the center frequencies, bandwidths or resource numbers as frequency information may be transmitted to mobile stations.

Dedicated control channels for transmitting the connection parameters including the center frequency and the cell ID for a Home eNB are not limited to a SCH, and any other channels for transmitting control information to individual users in a dedicated manner may be used.

Also, a deletion message for deleting the connection parameters may be transmitted to a mobile station a predefined time period after it is detected that the mobile station has exited from a tracking area. In the case where the mobile station migrates along the boundary of the tracking area, the mobile station may repeatedly enter and exit from the tracking area. Thus, it is desirable to delete the connection parameters after the location information on the mobile station is stabilized so that unnecessary addition and deletion of the connection parameters in the mobile station cannot be repeated.

This international patent application is based on Japanese Priority Application No. 2007-120260 filed on Apr. 27, 2007, the entire contents of which are hereby incorporated by reference.

The invention claimed is:

1. A connection control method, comprising:
   detecting at a mobile communication management node on a network that a mobile station belonging to a mobile station group associated with a certain user targeted base station has entered or appeared within a location registration area of the certain user targeted base station;
   transmitting connection information to the certain user targeted base station from the mobile communication management node to the mobile station in a in a dedicated channel corresponding to the mobile station via a public targeted base station where the mobile station resides; and
   upon detecting at the mobile communication management node that the mobile station has exited from the location registration area of the certain user targeted base station and entered or appeared in a location registration area unrelated to the certain user targeted base station, transmitting a deletion message from the mobile communication management node to the mobile station via a new serving base station in a dedicated channel, the deletion message causing the mobile station to delete the connection information on the certain user targeted base station.

2. The connection control method as claimed in claim 1, wherein the mobile station group comprises one or more mobile stations having a predefined attribute of mobile stations residing within a location registration area covering a range associated with the certain user targeted base station.

3. The connection control method as claimed in claim 2, wherein the attribute comprises permission for accessing the certain user targeted base station or existence of the mobile station within a coverage area for covering the certain user targeted base station and an adjacent public targeted base station.

4. The connection control method as claimed in claim 1, wherein the transmission of the connection information is triggered by membership of the mobile station in the mobile station group.

5. A connection control method, comprising:
- detecting at a mobile communication management node on a network that a mobile station permitted to access a certain user targeted base station has entered or appeared within a location registration area associated with the certain user targeted base station;
- transmitting connection information including at least frequency information presently used by the certain user targeted base station and ID information for the certain user targeted base station from the mobile communication management node to the mobile station in a dedicated manner via a public targeted base station where the mobile station resides; and
- performing cell search at the mobile station based on the connection information; and
- upon detecting at the mobile communication management node that the mobile station has exited from the location registration area of the certain user targeted base station and entered or appeared in a location registration area unrelated to the certain user targeted base station, transmitting a deletion message from the mobile communication management node to the mobile station via a new serving base station in a dedicated channel, the deletion message causing the mobile station to delete the connection information on the certain user targeted base station.

6. The connection control method as claimed in claim 5, further comprising:
- receiving adjacent cell frequency information broadcast from a public targeted base station at the mobile station, the public targeted base station where the mobile station resides,
- wherein the mobile station performs cell search based on the frequency information included in the connection information and the adjacent cell frequency information.

7. The connection control method as claimed in claim 5, further comprising:
- storing the transmitted connection information for the certain user targeted base station in the mobile station;
- detecting that the mobile station has exited or disappeared from the location registration area associated with the certain user targeted base station; and
- upon the detection that the mobile station has exited or disappeared, transmitting a message for instructing the mobile station to delete the stored connection information to the mobile station in a dedicated manner.

8. A mobile station for use in a mobile communication system including a certain user targeted base station, comprising:
- a dedicated information acquisition unit configured to, if the mobile station belongs to a mobile station group associated with the certain user targeted base station, acquire connection information for the certain user targeted base station from a mobile communication management node on a network in a dedicated manner via a public targeted base station where the mobile station resides;
- a broadcast information acquisition unit configured to acquire broadcast adjacent cell information on an adjacent cell in the public targeted base station;
- a memory unit configured to store the connection information and the broadcast adjacent cell information; and
- a cell search determination unit configured to perform cell search based on the acquired connection information for the certain user targeted base station and the broadcast adjacent cell information,
- wherein when the mobile communication management node detects that the mobile station has exited from the location registration area of the certain user targeted base station and entered or appeared in a location registration area unrelated to the certain user targeted base station, the mobile communication management node transmits a deletion message to the mobile station via a new serving base station in a dedicated channel, the deletion message causing the mobile station to delete the connection information on the certain user targeted base station, and upon receiving the deletion message, the mobile station deletes the connection information on the certain user targeted base station from the memory unit.

9. The mobile station as claimed in claim 8,
- wherein the cell search determination unit is configured to perform the cell search based on the connection information stored in the memory unit and the broadcast adjacent cell information.

10. The mobile station as claimed in claim 8, further comprising:
- a transmitting unit configured to, when the broadcast information acquisition unit acquires location registration area information different from existing location registration area information, transmit a location registration update request to a public targeted base station where the mobile station resides.

11. A mobile communication management apparatus for use in a mobile communication system including a certain user targeted base station, comprising:
- a memory unit configured to store identification information for the certain user targeted base station in association with mobile station information for a mobile station having a predefined attribute associated with the certain user targeted base station and frequency information presently used by the certain user targeted base station;
- a detection unit configured to monitor a location of the mobile station and detect that the mobile station having the predefined attribute has entered or appeared within a location registration area associated with the certain user targeted base station;
- an indication information generation unit configured to, when the detection unit detects that the mobile station having the predefined attribute has entered or appeared within the location registration area, generate connection information with reference to the memory unit, the connection information including at least the identification information and the frequency information for the certain user targeted base station; and
- a transmitting unit configured to transmit the connection information to the mobile station in a multicast channel corresponding to the mobile station group via a public targeted base station where the mobile station resides;
- wherein upon the detection unit detects that the mobile station has exited from the location registration area of the certain user targeted base station and entered or appeared in a location registration area unrelated to the certain user targeted base station, the transmitting unit transmits a deletion message to the mobile station via a new serving base station in a dedicated channel, the deletion message causing the mobile station to delete the connection information on the certain user targeted base station.

12. The mobile communication management apparatus as claimed in claim 11, wherein the detection unit detects that the mobile station has entered or appeared within the location registration area or that the mobile station has exited or disappeared from the location registration area by monitoring the location of the mobile station at a level of location registration areas.

* * * * *